United States Patent
Sone

(10) Patent No.: US 7,557,969 B2
(45) Date of Patent: Jul. 7, 2009

(54) COLOR BALANCE CORRECTION CHART, COLOR BALANCE CORRECTION METHOD, AND IMAGE FORMING APPARATUS

(75) Inventor: Toshihiro Sone, Yokohama (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 883 days.

(21) Appl. No.: 10/805,332

(22) Filed: Mar. 22, 2004

(65) Prior Publication Data
US 2005/0206978 A1 Sep. 22, 2005

(51) Int. Cl.
*H04N 1/46* (2006.01)

(52) U.S. Cl. ............... 358/504; 358/474; 358/465; 358/466; 358/505; 358/516; 358/518; 382/167

(58) Field of Classification Search ............... 358/504, 358/509, 461, 516, 518, 406; 382/274, 167; 282/167
See application file for complete search history.

(56) References Cited

U.S. PATENT DOCUMENTS

| | | | | |
|---|---|---|---|---|
| 5,084,729 A * | 1/1992 | Yakubo et al. | ................. | 355/74 |
| 5,774,760 A * | 6/1998 | Nagashima | ................. | 399/39 |
| 5,995,248 A * | 11/1999 | Katori et al. | ................. | 358/2.1 |
| 6,628,436 B1 * | 9/2003 | Sone | ................. | 358/505 |
| 2003/0002735 A1 * | 1/2003 | Yamamoto et al. | ......... | 382/167 |
| 2003/0063327 A1 | 4/2003 | Sone | | |

FOREIGN PATENT DOCUMENTS

| | | | |
|---|---|---|---|
| JP | 5-216135 A | | 8/1993 |
| JP | 07-273940 | * | 10/1995 |
| JP | 7-273940 A | | 10/1995 |

\* cited by examiner

*Primary Examiner*—Twyler L Haskins
*Assistant Examiner*—Dennis Dicker
(74) *Attorney, Agent, or Firm*—Foley & Lardner LLP

(57) ABSTRACT

In the present invention, a front-side focal distance L2 is changed without changing a rear-side focal distance L1 so as to bring an MTF value D2 and brightness fluctuation D3 into an MTF balance range, so that collapse of color balance can be improved, and life of optical members such as a light source can be extended.

8 Claims, 5 Drawing Sheets

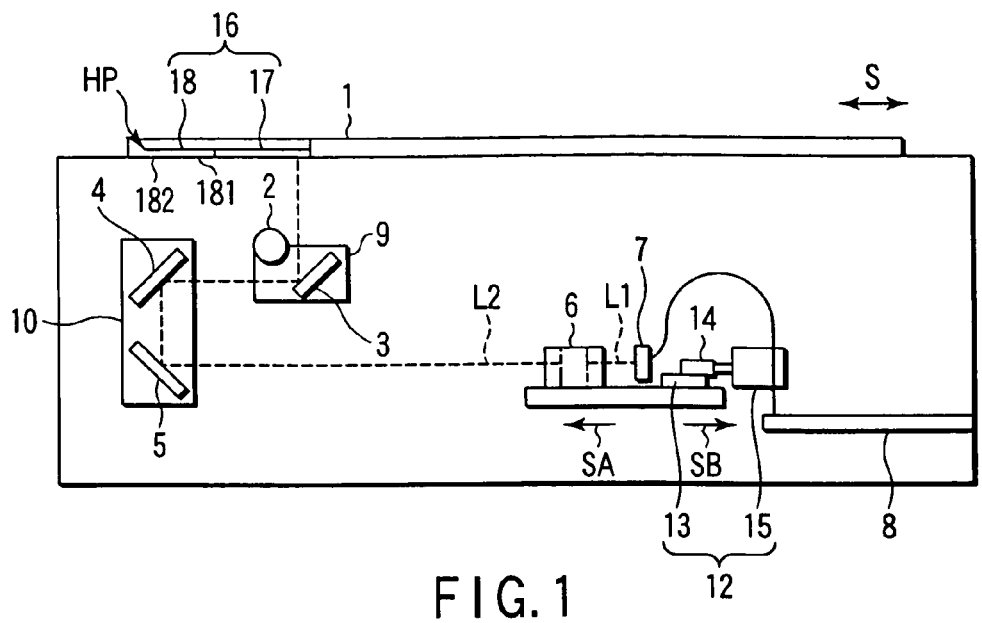
F I G. 1
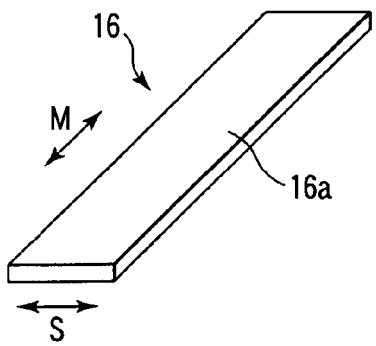
F I G. 2
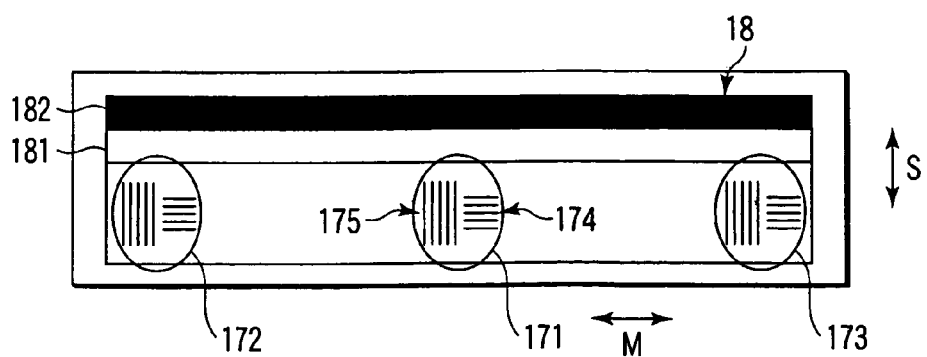
F I G. 3

COLOR BALANCE CORRECTION CHART, COLOR BALANCE CORRECTION METHOD, AND IMAGE FORMING APPARATUS

BACKGROUND OF THE INVENTION

1. Field of the Invention

The present invention relates to an image reading apparatus which reads a color image, and a test chart for correcting color balance.

2. Description of the Related Art

Light from light sources such as a fluorescent lamp and a halogen lamp in a scanner for reading a draft has an emission intensity which is lower at opposite end portions than at a middle portion. Therefore, when a CCD sensor comprising four lines including monochromatic lines and lines for color is used as a photoelectric conversion element, there is a problem that brightness of the opposite end portions of the CCD sensor drops compared with the middle portion of the sensor. It is known that this is why shading correction is executed with respect to electronic data from the CCD sensor.

The line sensor for color produces electronic data from an output of each of red (R), green (G), blue (B) colors. However, the color balance of the light from the light source collapses with an elapse of time. Therefore, a balance in a range of a difference (MAX-MIN) between a maximum value and a minimum value of the output value of each color also sometimes collapses.

For example, it is known that when a xenon lamp is used in the light source, the lamp is degraded, and the emission balance collapses, blue emission degradation occurs, emitted light entirely becomes reddish, and the MAX value of the output value of each color changes, for example, like R: 5V, G: 3V, B: 1V.

The output from this CCD sensor is improved by the shading correction. However, since the balance of the ratio of the original output value range is bad, it has been difficult to suppress degradation of resolution only with the shading correction.

Moreover, this collapse of the color balance raises a problem that a color character is recognized even in the case where a black character draft is read.

The collapse of the color balance is sometimes caused by irregular reflection by dirt on a mirror or the like, and there is a problem that reflectance for each light having a different emission frequency is degraded.

Furthermore, when the problem of the color balance occurs, there is a problem of cost increase because optical members such as the lamp of the light source and the mirror are required to be changed. There is also a problem that a maintenance cycle of cleaning by a serviceman is shortened.

An object of the present invention is to provide an image reading apparatus including a photoelectric conversion element for color, which is capable of improving deterioration of resolution by collapse of color balance and preventing wrong recognition of color and extending life of an optical member.

BRIEF SUMMARY OF THE INVENTION

According to an aspect of the present invention, there is provided a color balance correction chart device comprising:
a white reference chart comprising a first concentration; and
a line reference chart comprising a first line pattern including a plurality of lines of a first direction comprising a second concentration and a second line pattern including a plurality of lines of a second direction having a predetermined angle with the first direction, the first and second line patterns having a predetermined interval comprising the first concentration,
wherein a line value based on a reflected light from the line reference chart is compared with a balance range based on a first concentration level corresponding to a brightest portion of an image based on the reflected light from the white reference chart and a second concentration level corresponding to a darkest portion of the image, and a color balance of outputs obtained from a plurality of color sensors can be corrected in a case where the line value is outside the range.

According to another aspect of the present invention, there is provided an image reading apparatus comprising:
a light source which irradiates a reading object with light;
a photoelectric conversion element including a plurality of color sensors upon which a reflected light from the reading object is incident and which are long in a main scanning line direction;
a lens disposed on an optical path of the light guided into the photoelectric conversion element from the light source;
a white reference chart comprising a first concentration;
a line reference chart comprising the first concentration and a second concentration;
a balance judgment mechanism which judges whether or not an amplitude of a line signal based on the reflected light from the line reference chart satisfies a color balance condition;
a moving force generation mechanism which applies a predetermined moving force in a case where the light signal does not satisfy the balance condition; and
a moving mechanism to move the lens and the photoelectric conversion element and to change an optical path length between the light source and the lens while securing a certain optical path length between the lens and the photoelectric conversion element, when the predetermined moving force is applied to the moving mechanism from the moving force generation mechanism.

According to further another aspect of the present invention, there is provided a color balance correction method comprising:
obtaining a first concentration level corresponding to a darkest portion of an image;
obtaining a second concentration level corresponding to a brightest portion of the image based on a reflected light from a white reference chart;
obtaining a line signal based on the reflected light from a line chart;
executing an MTF balance mode to judge whether or not the line signal satisfies a balance condition; and
executing a moving mode to move a lens and a photoelectric conversion element simultaneously by a predetermined distance in a sub-scanning line direction in order to change a front-side focal distance so that the line signal satisfies the balance condition while securing a certain rear-side focal distance, when the line signal satisfies the balance condition.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a schematic diagram showing an example of an image reading apparatus provided with a color balance correction mechanism of the present invention;

FIG. 2 is a schematic diagram showing an example of a correction plate mounted on the image reading apparatus shown in FIG. 1;

FIG. 3 is a schematic diagram showing an example of a color balance correction chart of the present invention formed on a correction plate shown in FIG. 2;

DETAILED DESCRIPTION OF THE INVENTION

Figure 4:
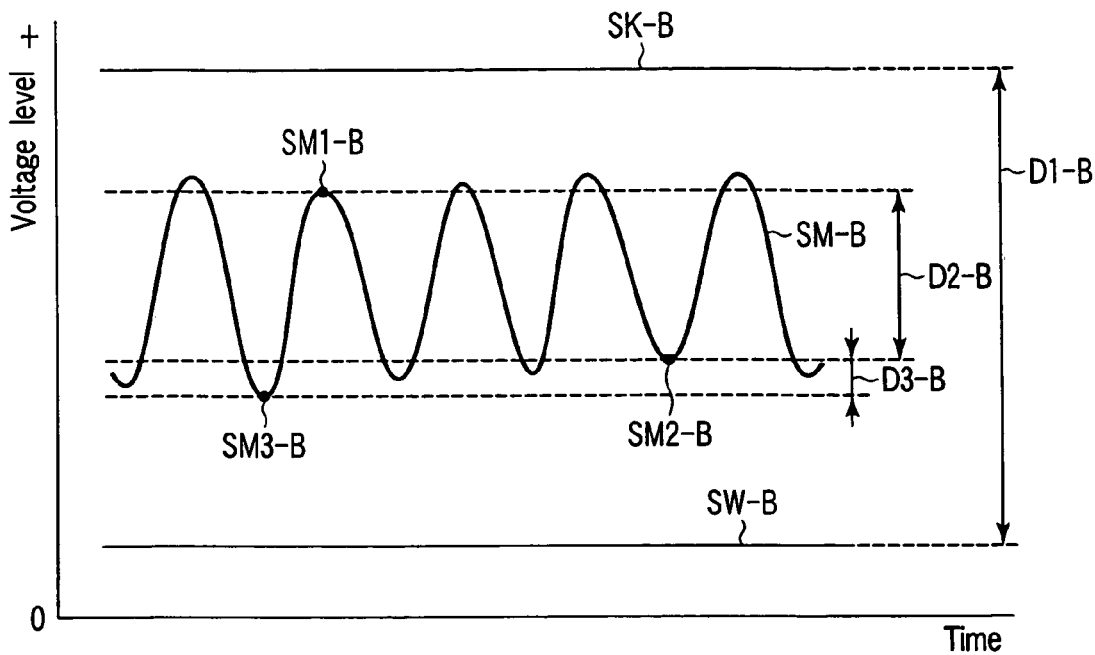
FIG. 4 is a reference diagram showing a read signal from the correction chart shown in FIGS. 2 and 3.

An example of an image reading apparatus to which an embodiment of the present invention is applied will be described hereinafter with reference to drawings.

As shown in FIG. 1, the image reading apparatus includes a draft table 1, a light source 2, a first mirror 3, a second mirror 4, a third mirror 5, a lens 6, a photoelectric conversion element 7, an image processing section 8, a first carriage 9, a second carriage 10, a lens base 11, a base moving mechanism 12, and a correction plate 16.

The draft table 1 is a transparent plate-like flat body formed of glass, and holds a reading object horizontally.

The light source 2 is formed, for example, of a xenon lamp, and is moved parallel to and under the draft table 1 to irradiate the reading object with light while maintaining a certain distance from the reading object.

The first mirror 3 guides the reflected light from the reading object to the second mirror 4.

The second and third mirrors 4, 5 reverse the direction of the reflected light from the first mirror 3 to guide the light into the lens 6.

The lens 6 includes a front-side main flat surface 6A and a rear-side main flat surface 6B, and imparts a predetermined image forming magnification to the light from the second and third mirrors 4, 5 to form the image on the photoelectric conversion element 7.

The photoelectric conversion element 7 is, for example, a charge-coupled device (CCD), and comprises a color line sensor for color 7C and a monochromatic line sensor for monochromaticity 7K disposed in a row parallel to a main scanning line direction.

The CCD 7 photoelectrically converts incident light to output a read signal (image signal). The image processing section 8 subjects the signal output from the CCD 7 to predetermined processing, and includes a control system described later with reference to FIG. 5. For example, the image signal is obtained as image information of the reading object output from the CCD 7, and the predetermined image processing can be executed. It is to be noted that the image processing section is connected, for example, to an image forming apparatus, and image information may also be output as the image signal of a copying object.

The first carriage 9 holds the light source 2 and first mirror 3, and the second carriage 10 holds the second and third mirrors 4, 5, and is moved along the draft table 1 at a predetermined speed so that the reflected light from the reading object secures a predetermined optical path length to the lens 6. It is to be noted that in the following description, a direction in which the first and second carriages 9, 10 move will be referred to as a sub-scanning line direction S, and a direction crossing the sub-scanning line direction S at right angles will be referred to as a main scanning line direction M.

The lens base 11 holds the lens 6 and photoelectric conversion element 7. A lens unit including them is moved in the sub-scanning line direction by the base moving mechanism 12 while securing a distance L1 (rear-side focal distance) between the rear-side main flat surface 6B of the lens 6 and the photoelectric conversion element 7, and a distance L2 (front-side focal distance) between a reflected point at which the light from the light source 2 is reflected from the reading object and the front-side main flat surface 6A of the lens 6 is changed.

The base moving mechanism 12 comprises a rack 13 disposed, for example, in a predetermined position of the lens base 11, a pinion 14 interlocking with the rack 13, and a motor 15 which applies a predetermined power to the pinion 14, and details will be described later. It is to be noted that what applies the predetermined power to the pinion 14 is not limited to the motor.

The correction plate 16 is disposed on one end of the sub-scanning line direction S of the draft table 1, and includes an MTF chart 17 in the vicinity of the draft table 1 and a black/white chart 18 adjacent to the MTF chart 17.

A read operation will be described hereinafter.

The reading object is irradiated with the light radiated from the light source 2 with the movement of the first and second carriages 9, 10 moving while securing the distance L2 as a predetermined optical path length. The reflected light from the reading object is reflected by the first, second, and third mirrors 3, 4, 5 in order, passed through the lens 6, and formed into the image on the surface of the CCD 7. The CCD 7 outputs the image signal (read signal) of the color image from the color line sensor 7C, and outputs the image signal of the monochromatic image from the monochromatic line sensor 7K.

Next, a correction plate usable in FIG. 1 will be described in detail.

FIG. 2 shows a schematic diagram of the correction plate 16 of the present invention, and FIG. 3 shows an example of a correction chart formed on a surface 16a of the correction plate 16 of the present invention.

As shown in FIG. 2, the correction plate 16 has a rectangular shape which is long in the main scanning line direction, and the correction chart is held on the surface 16a. The correction chart can be easily mounted on an optional image reading apparatus by the use of the correction plate 16.

The correction plate 16 is preferably formed of a member which is not thermally deformed, but may also be plastic, paper or the like.

Moreover, as shown in FIG. 3, the correction chart comprises the MTF chart 17 and black/white chart 18.

The black/white chart 18 includes a white-color white reference chart 181 to which a region including substantially the whole area of the draft table 1 in a width (depth) direction is allotted, and a black-color black reference chart 182 to which an area substantially equal to that of the white reference chart 181 is allotted.

The white reference chart 181 has a first concentration level corresponding to a brightest portion of an image, and the black reference chart 182 has a second concentration level corresponding to a darkest portion of the image.

A substrate of the MTF chart 17 has a concentration equal to that of the white reference chart 181, and the MTF chart includes a middle line chart 171 in a middle portion and end portion line charts 172, 173 disposed in a symmetric position centering on the middle line chart 171 in a main scanning direction. In the present embodiment, for example, the middle line chart 171 is disposed in a position facing a lens center and having an image height 0%, and the end portion line charts 172, 173 are disposed in positions connected to an image height 95%. The arrangement positions of the end portion line charts 172, 173 may be positions corresponding to an image height 70% or more.

Moreover, in other words, the middle line chart 171 is disposed in the middle portion having the image height 0% in which an optical axis of light to be irradiated is positioned, and the end portion line charts 172, 173 are disposed in the positions centering on the middle portion having the image height 0% as a reference and symmetric with each other in the main scanning direction, which are predetermined positions having the image height 70% or more.

Each of the middle line chart 171 and end portion line charts 172, 173 comprises a first line pattern 174 which is a set of a plurality of parallel lines arranged at predetermined intervals, and a second line pattern 175 which is a set of a plurality of parallel lines arranged in a vertical direction with respect to the lines of the first line pattern 174 and arranged at predetermined intervals. The first line pattern 174 is parallel to the main scanning line direction M, and the second line pattern 175 is parallel to the sub-scanning line direction S.

It is to be noted that in the present embodiment, for example, each of the first and second line patterns 174, 175 comprises five lines including 5.6 line pairs (lp).

Moreover, the MTF chart 17 may include only the middle line chart 171. Two line charts are formed symmetrically with respect to a middle in the position of the image height 70% in addition to three middle/opposite end portion line charts 171 to 173, and the chart may include five line charts in total.

Furthermore, the first and second line patterns may also have a predetermined inclination. A thickness of the line, and a line interval in each of the above-described patterns may not be uniform.

It is to be noted that the above-described image height indicates a predetermined position in the main scanning line direction of a line receiving region of the photoelectric conversion element. Assuming that a central portion is set to 0%, and each of the opposite end portions is set to 100%, a position between them is indicated in a percentage.

In the present embodiment, the black reference chart 182 has been used, but the present invention is not limited to this chart. For example, the black reference chart 182 is omitted, radiation of the light from the light source 2 is stopped using a correction pattern comprising the white reference chart 181 and MTF chart 17, so that a black level may also be obtained. They may also be combined, the vicinity being darkened using the black reference chart 182 to stop the radiation of the light from the light source 2, and accordingly a quantity of light incident upon the CCD 7 may be minimized.

Moreover, the correction chart of the present invention may also be disposed directly in a predetermined position of the image forming apparatus without using the correction plate 16.

Furthermore, in the present embodiment, a constitution in which the MTF chart 17 and black/white chart 18 are aligned and arranged in the correction plate 16 has been described as an example, but the present invention is not limited to this example. The charts may also be disposed in predetermined positions in accordance with separated and mounted image reading apparatus.

Additionally, when a white concentration of the substrate of the MTF chart 17 is equal to that of the white reference chart 181, the chart can be prepared by the same members, and a manufacturing process can be simplified, but the concentration may also be different.

FIG. 4 is a reference diagram showing a read signal from the correction chart shown in FIGS. 2 and 3.

As shown in FIG. 4, the abscissa indicates time, and the ordinate indicates a voltage level of the signal output from the CCD 7. Here, a change of the voltage level of the signal output from the color line sensor 7C will be described in accordance with a signal output from a blue line sensor 7B as an example.

A black level SK-B is a read signal of the black reference chart 182 output from the blue line sensor 7B, a white level SW-B is a read signal of the white reference chart 181 output from the blue line sensor 7B, and an MTF value SM-B is a read signal of the MTF chart 17 output from the blue line sensor 7B.

A color reproduction range (MFT value, MFT difference, chromatic aberration) D1-B is defined by a difference between the black level SK-B and the white level SW-B.

The MTF signal SM-B has an amplitude in accordance with the pattern of the MTF chart. As shown in FIG. 4, the MTF signal SM-B includes an MTF signal SM1-B having a lowest voltage level in a plurality of vertexes (maximum value in the vicinity of a black level), an MTF signal SM2-B having a highest voltage level in a plurality of bottom portions (minimum value in the vicinity of a white level), and an MTF signal SM3-B having a lowest voltage level in a plurality of bottom portions.

For example, an output width of the MTF signal SM-B is defined by an MTF value D2-B which is a difference between the MTF signals SM1-B and SM2-B. A fluctuation of brightness of the xenon lamp is defined by a brightness fluctuation value D3 which is a difference between the MTF signals SM2-B and SM3-B. It is to be noted that in the present embodiment, the output width of the MTF signal SM-B is an output value from which a fluctuation portion of an output level of the amplitude is deleted, but the present invention is not limited to this value, and the value may also be an average value of the MTF signals SM-B, an absolute value, or a value calculated by predetermined calculation.

Additionally, the MTF value D2-B and brightness fluctuation D3-B may preferably have a predetermined or more ratio with respect to the color reproduction range D1-B. However, as described above, the MTF value D2-B sometimes decreases, or the brightness fluctuation D3-B spreads by the deterioration or dirt of the lamp which is the light source 2. This causes a problem that the color balance deteriorates.

In the present invention, to improve this, it is judged whether or not the MTF value D2-B and brightness fluctuation D3-B satisfy predetermined color MTF balance conditions. When the conditions are not satisfied, a predetermined driving power is supplied to the motor 15, and the lens base 11 to which the lens 6 and CCD 7 are fixed is moved in the sub-scanning line direction S.

It is to be noted that in a color MTF balance range, the MTF value D2-B from the line sensor 7B is 40% or more of the color reproduction range D1-B, and the brightness fluctuation D3-B of the line sensor 7B is 10% or less of the color reproduction range D2-B. The color MTF balance range is not limited to the above-described range, and is determined by a predetermined value in accordance with the image reading apparatus. For example, the MTF value D2 is more preferably 35% or more of the color reproduction range (MFT value) D2, and the brightness fluctuation D3 is 10% or less of the color reproduction range (MFT difference, chromatic aberration) D2.

Figure 5:
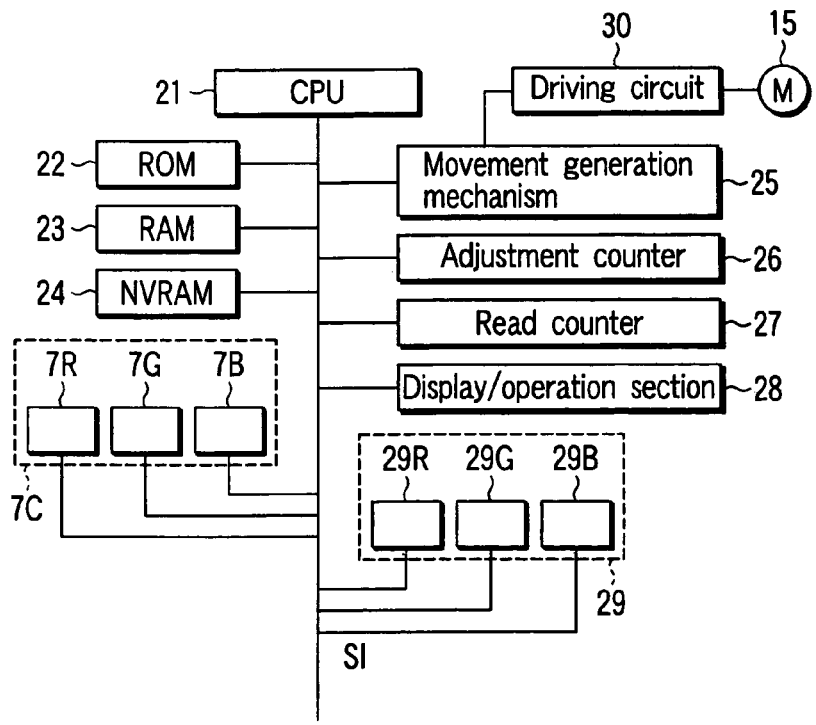
FIG. 5 is a block diagram showing an example of a control system of the image reading apparatus shown in FIG. 2.

FIG. 5 shows a block diagram showing a control system of the image reading apparatus shown in FIG. 1.

As shown in FIG. 5, a CPU 21 is connected to a ROM 22, a RAM 23, an NVRAM 24, a moving force generation mechanism 25, an adjustment counter 26, a read counter 27, a display/operation section 28, a balance judgment mechanism 29, and the color line sensor 7C.

The color line sensor 7C detects a color image as red (R), green (G), blue (B) which are three primary colors of additive mixture of color stimuli, and therefore includes a red line sensor 7R, a green line sensor 7G, and a blue line sensor 7B.

The CPU 21 includes an operation region for use during operation in accordance with an operation program or the like, and a cache memory region in which information is temporarily stored, and generally controls the image reading apparatus.

In the ROM 22, the operation program of the reading apparatus is stored beforehand.

The RAM 23 is a storage section.

The NVRAM 24 is a nonvolatile memory, and information is stored even after a main power supply is turned OFF.

The moving force generation mechanism 25 is connected to a driving circuit 30. When a moving signal SI output from the balance judgment mechanism 29 is input, a predetermined driving signal SD is output to the driving circuit 30.

The driving signal SD is input into the driving circuit 30, and a predetermined driving power is supplied to the motor 15 to move the lens base 11 in the sub-scanning line direction S. It is to be noted that when the lens base 11 moves toward the third mirror 5 in a sub-scanning line direction front SA (see FIG. 1), the front-side focal distance L2 shortens. When the lens base 11 moves in a sub-scanning line direction rear SB (see FIG. 1) which is a direction opposite to the third mirror 5, the front-side focal distance L2 lengthens.

The adjustment counter 26 counts the number of times of color MTF balance adjustments, in other words, the number (adjustment number) N of driving times of the driving circuit 30 by the moving force generation mechanism 25. The adjustment number N is stored in the RAM 23.

The read counter 27 counts the number of read operations after the manufacturing (read operation number T). The read operation number T is stored in the NVRAM 24.

The display/operation section 28 includes a display section capable of displaying an instruction for cleaning or changing of a predetermined member to be mounted on the device, and an operation section in which a user can direct the read operation, selection of a read mode, and the like.

The balance judgment mechanism 29 includes a judgment section 29R to which the signal output from the red line sensor 7R is supplied, a judgment section 29G to which the signal output from the green line sensor 7G is supplied, and a judgment section 29B to which the signal output from the blue line sensor 7B is supplied.

The judgment section 29B judges whether or not the input MTF value D2-B and brightness fluctuation D3-B are in the color MTF balance range. When they are out of the range, the moving signal SI is output to the moving force generation mechanism 25. Moreover, a degree of deterioration of the color balance (balance deterioration degree P) which is a shift between the MTF signal SM-B and an MTF balance range can be stored in the RAM 23.

It is to be noted that the judgment sections 29G and 29R also have functions similar to those of the judgment section 29B.

Next, an operation in a case where the correction plate 16 is read will be described.

When the first and second carriages 9, 10 are moved to a home position HP, an ON signal is sent to the light source 2 from the CPU 21 to irradiate the black reference chart 182 by the light source 2 in accordance with a detection result from a home position detection section disposed, for example, in the first carriage 9. The reflected light from the black reference chart 182 is guided into the CCD 7, and the black level SK corresponding to the darkest portion of the image.

During this operation, the first and second carriages 9, 10 are accelerated at a predetermined speed by a carriage motor (not shown), and have a constant speed before reaching the white reference chart 181. By the first and second carriages 9, 10 capable of moving in a direction toward the draft table 1 from the home position HP at a constant speed, the white reference chart 181 and MTF chart 17 are irradiated with the light from the light source 2 in order, the reflected light is guided into the CCD 7, and a white level SW corresponding to the brightest portion of the image is obtained from the read light of the white reference chart 181. The MTF signal SM is obtained from the read light of the MTF chart 17.

A black level SK-R, white level SW-R, and MTF signal SM-R output from the red line sensor 7R are supplied to the judgment section 29R. The judgment section 29R refers to a color reproduction range D1-R based on the black level SK-R and white level SW-R to judge whether or not an MTF value D2-R based on the MTF value SM-R is in the color MTF balance range.

Similarly, a black level SK-G, white level SW-G, and MTF signal SM-G output from the green line sensor 7G are supplied to the judgment section 29G. The judgment section 29G refers to a color reproduction range D1-G based on the black level SK-G and white level SW-G to judge whether or not an MTF value D2-G based on the MTF value SM-G is in the color MTF balance range.

Furthermore, a black level SK-B, white level SW-B, and MTF signal SM-B output from the blue line sensor 7B are supplied to the judgment section 29B. The judgment section 29B refers to a color reproduction range D1-B based on the black level SK-B and white level SW-B to judge whether or not an MTF value D2-B based on the MTF value SM-B is in the color MTF balance range.

When at least one of the judgment sections 29R, 29G, 29B outputs the moving signal SI to the moving force generation circuit 25, the moving force generation circuit 25 outputs the driving signal SD to the driving circuit 30. The driving circuit 30 into which the driving signal is input drives the motor 15 and moves the lens base 11.

Figure 6:
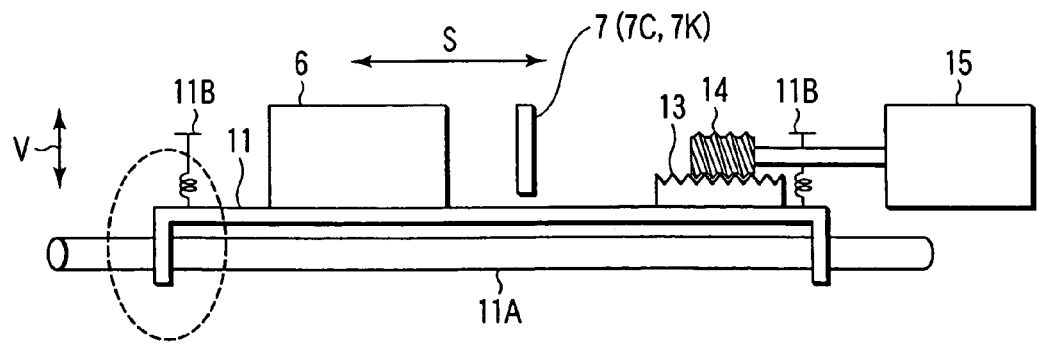
FIG. 6 is a schematic sectional view showing an example of a base moving mechanism shown in FIG. 1.
Figure 7:
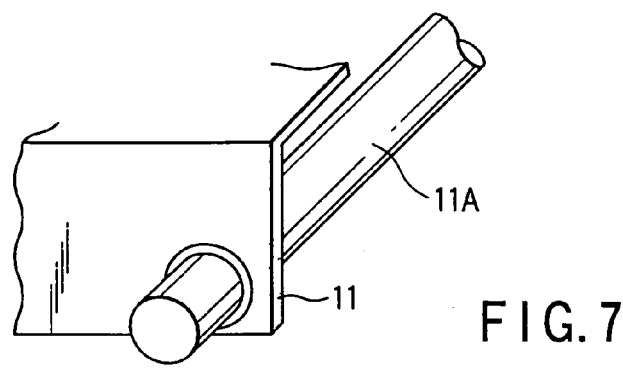
FIG. 7 is a schematic sectional view showing an example of the base moving mechanism shown in FIG. 1.
Figure 8:
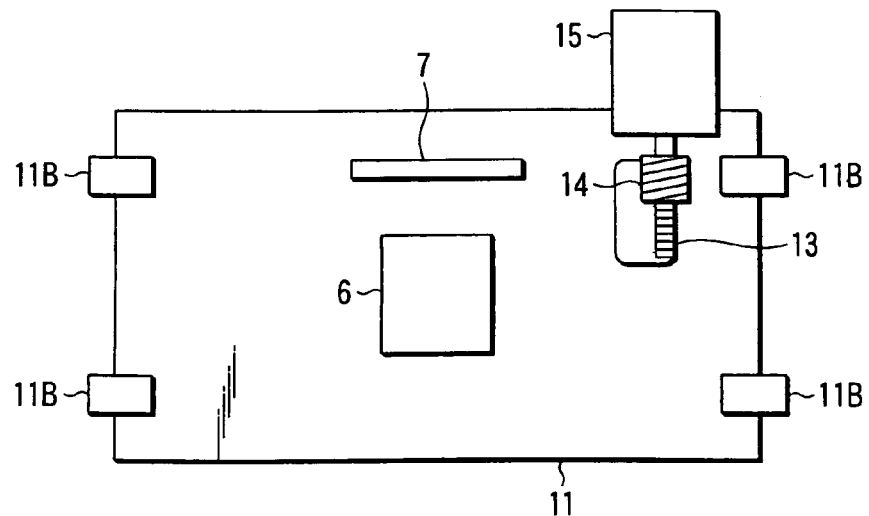
FIG. 8 is a schematic sectional view showing an example of the base moving mechanism shown in FIG. 1.

FIGS. 6, 7 and 8 show an example of the base moving mechanism shown in FIG. 1.

The lens base 11 to which the lens 6 and the CCD 7 are fixed is movably supported by a lens base rail 11A as shown in FIG. 7. As shown in FIGS. 6 and 8, a pressure in a vertical direction V with respect to a lens base surface is applied by a lens base presser spring 11B to stop the base in a predetermined position.

For example, each of the rack 13 and the pinion 14 has teeth formed at a pitch of 1 mm, they interlock with each other, and a minimum moving amount is 0.5 mm. In the present embodiment, a moving distance X1 is 0.5 mm.

It is to be noted that the rack 13 may also be formed by cutting and raising the surface of the lens base 11.

Moreover, the base moving mechanism is not limited to the above-described constitution, and may also be constituted such that, for example, the lens base comprises a thread portion, and a predetermined moving force in the sub-scanning line direction S is applied by the thread portion.

Next, a method of moving the lens base will be described.

When the moving signal Si is supplied from the balance judgment mechanism 29, the moving force generation mechanism 25 outputs the driving signal SD to the driving circuit 30 to drive the motor 15. The motor 15 rotates the pinion 14 in such a manner that the lens base 11 moves by the distance X1 in the predetermined direction, and the lens base 11 moves by the distance X1 via the rack 13.

It is to be noted that as described above, the lens base 11 is disposed so as to be movable only in the sub-scanning line direction S by the lens base rail 11A and lens base presser spring 11B. Even when a predetermined moving amount is applied, the inclination of the lens 6, or the optical axis of the light incident upon the lens 6 from the light source 2 can be minimized.

Therefore, only the color balance can be adjusted without degrading resolution of the color sensor 7C set at a shipping time from a factory.

Figure 9A:
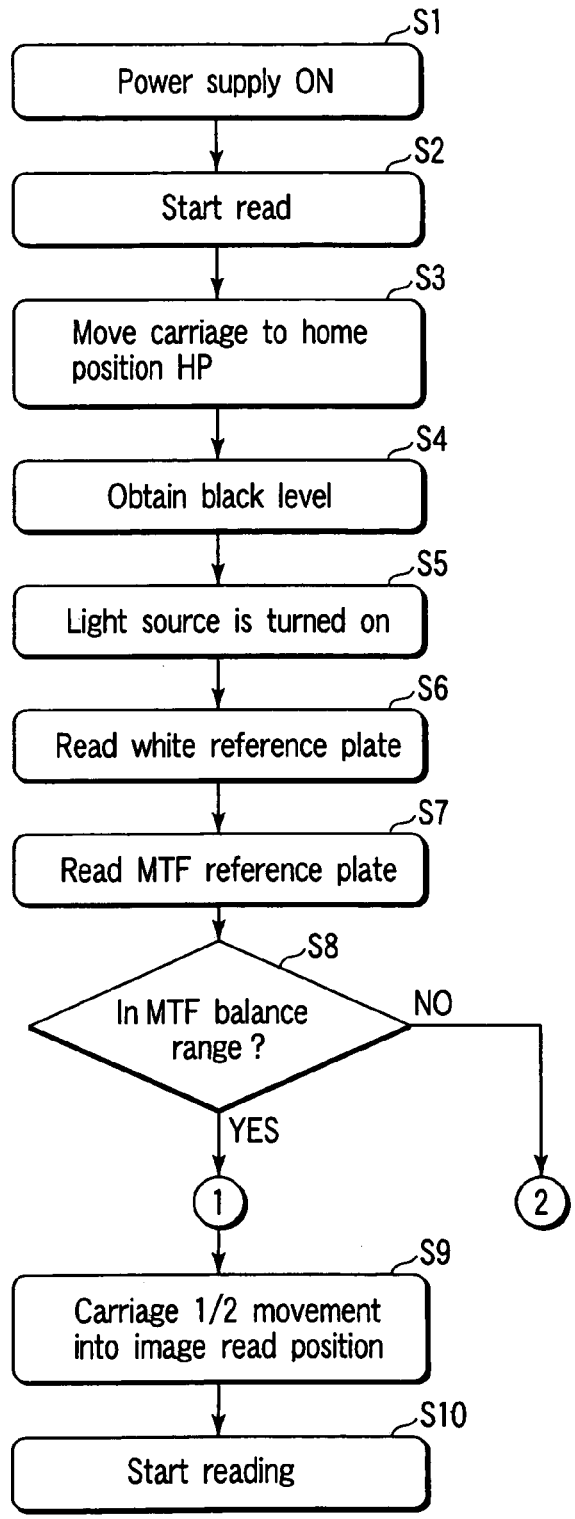
FIGS. 9A and 9B are flowcharts showing an example of a color balance correction method of the present invention.
Figure 9B:
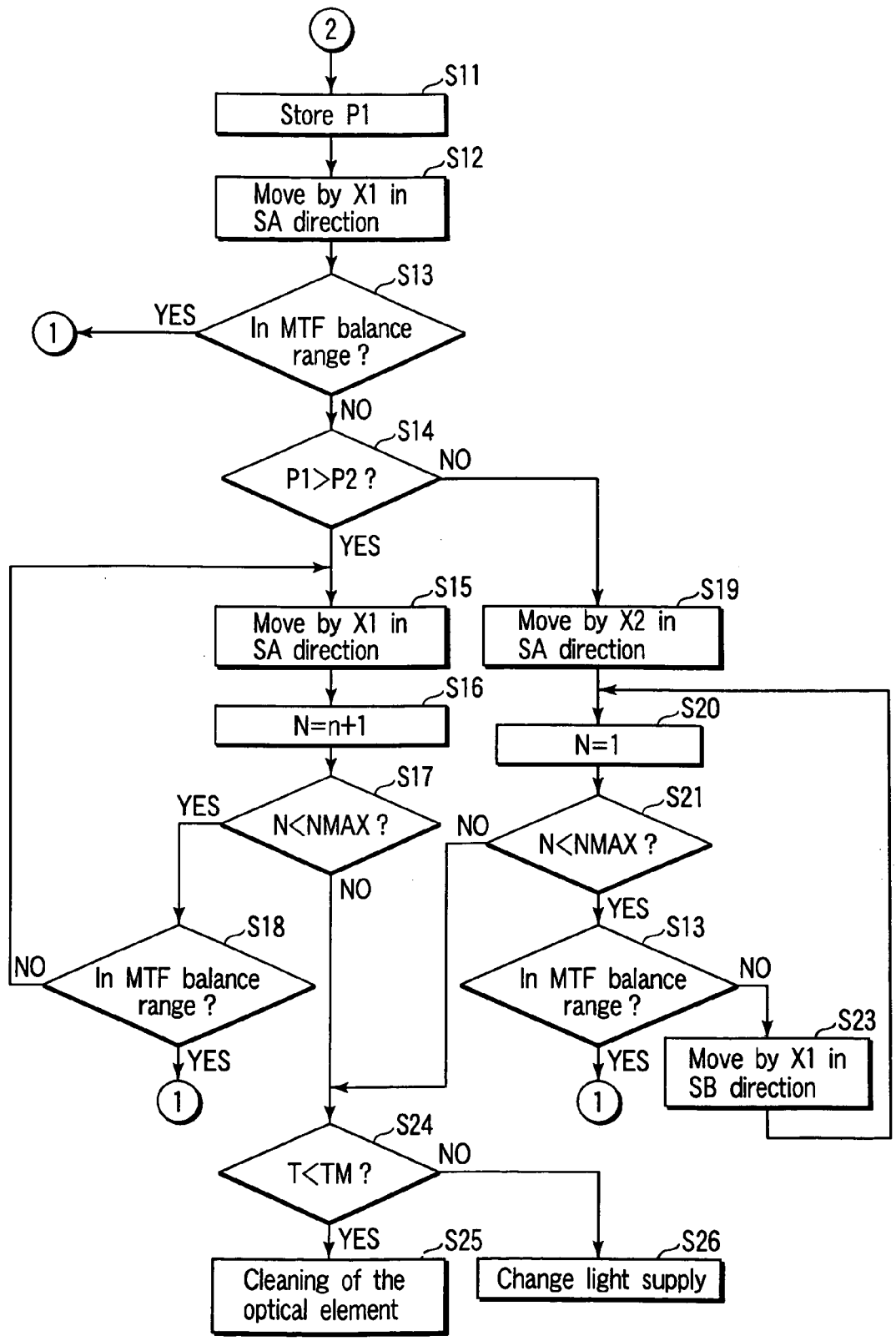

FIGS. 9A and 9B show flowcharts showing a color balance adjustment method of the present invention.

As shown in FIG. 9A, when the power supply of the image reading apparatus is turned ON (S1), and predetermined read conditions are set beforehand to direct the read operation (S2), the first and second carriages 9, 10 are moved to the home position HP (S3).

The first and second carriages 9, 10 are moved below the black reference chart 182, and the black level SK is obtained from the MTF chart 17 in a state in which the light is not emitted from the light source 2 (S4).

The light source 2 is turned ON before the white reference chart 181 (S5), and simultaneously the moving speeds of the first and second carriages 9, 10 become constant.

The white reference chart 181 is irradiated with the light from the light source 2, the reflected light (read light) is guided into the CCD 7, and the white level SW is obtained (S6).

Subsequently, the MTF chart 17 is irradiated with the light from the light source 2, the reflected light (read light) is guided into the CCD 7, and the MTF signal SM is obtained (S7).

It is judged whether or not the MTF value D2 and brightness fluctuation value D3 based on the MTF signal SM are in the MTF balance range (S8). . . . MTF balance mode.

When the MTF value 2 and brightness fluctuation value D3 are in the range (YES in S8), the first and second carriages 9, 10 move to an image read position (S9), the reading object is irradiated with the light of the light source 2 from below, and the reading object is read (S10).

A movement mode will be described hereinafter.

When at least one of the MTF value D2 and the brightness fluctuation value D3 is out of the MTF balance range in step S8 (NO in S8), a balance deterioration degree P1 is stored in the RAM 23 (S11), and the lens base 11 moves by the predetermined distance X1 in the sub-scanning line direction front SA (S12). That is, the front-side focal distance L2 shortens.

Subsequently, the first and second carriages 9, 10 are moved to the home position HP again, the white reference chart 181 and MTF chart 17 are irradiated with the light from the light source 2, and the black level SK, white level SW, and MTF signal SM are obtained. The MTF value D2 and brightness fluctuation value D3 based on the MTF signal SM are compared with the MTF balance range (S13). When the MTF value D2 and the brightness fluctuation value D3 are in the range, the process advances to steps S9, 10, and shifts to a read operation of the reading object (YES in S13).

When at least one of the MTF value D2 and the brightness fluctuation value D3 is out of the range in step S13 (NO in S13), a balance deterioration degree P2 is compared with the balance deterioration degree P1 stored in the RAM 23 in step S11 (S14).

When the balance deterioration degree P1 is larger than the balance deterioration degree P2 (YES in S14), the lens base 11 is moved in the sub-scanning line direction front SA, it is accordingly that the color MTF balance has been improved, and the lens base 11 is further moved by the distance X1 in the sub-scanning line direction front SA (S15). Subsequently, the adjustment number (N=n+1) is counted from N=2 (S16). The adjustment number N is compared with an adjustment limit number NMAX (S17). When the adjustment number N does not reach the adjustment limit number NMAX (YES in S17), the white reference chart 181 and MTF chart 17 are read to judge whether or not the MTF value D2 and brightness fluctuation value D3 are in the MTF balance range in the same manner as in steps S5 to S7 again (S18).

When the MTF value D2 and brightness fluctuation value D3 are in the range, the process advances to steps S9, 10, and shifts to the read operation of the reading object (YES in S18). When at least one of the MTF value D2 and the brightness fluctuation value D3 is out of the range, the process returns to step S15 to move the lens base 11 every distance X1 in the sub-scanning line direction front SA so that the values are in the MTF balance range (NO in S18).

On the other hand, when the balance deterioration degree P2 is larger than the balance deterioration degree P1 in step S14 (NO in S14), it is judged that the color MTF balance is not improved by moving the lens base 11 in the sub-scanning line direction front SA, and the lens base 11 is moved by a distance X2 which is twice the distance X1 in the sub-scanning line direction rear SB (S19). Subsequently, the adjustment number (N=n) is counted from N=1 (S20).

The adjustment number N is compared with the adjustment limit number NMAX (S21). When the adjustment number N does not reach the adjustment limit number NMAX (YES in S21), and the white reference chart 181 and MTF chart 17 are read to judge whether or not the MTF value D2 and brightness fluctuation value D3 are in the color MTF balance range in the same manner as in steps S5 to S7 again (S22).

When the MTF value D2 and brightness fluctuation D3 are in the range, the process advances to steps S9, 10, and shifts to the read operation of the reading object (YES in S22). When at least one of the MTF value D2 and the brightness fluctuation D3 is out of the range (NO in S22), the lens base 11 is moved by the distance X1 in the sub-scanning line direction rear SB (S23). The process returns to step S20 to move the lens base 11 every distance X1 in the sub-scanning line direction rear SB so that the values are in the MTF balance range.

When it is judged in step S17 that the adjustment number N does not reach the adjustment limit number NMAX (NO in S17), or when it is judged that the adjustment number N does not reach the adjustment limit number NMAX (NO in S21), another factor for collapse of the color balance is considered, and it is therefore judged whether or not the read operation number T exceeds a maintenance cycle TM (S24).

When the number does not exceed the maintenance cycle TM, dirt on optical elements such as the first to third mirrors 3 to 5, lens 6, and CCD 7 is considered to be a factor for a color balance collapse, and therefore the cleaning of the optical element is instructed (S25).

When the number exceeds the maintenance cycle TM in step S23, the light source is changed or the cleaning is instructed (S26).

It is to be noted that the instruction of the cleaning or changing in steps S24, S25 is displayed, for example, in the display section 28, and a serviceman or the like performs the cleaning or the changing.

The maintenance cycle is a reference indicating the life of the light source 2 or the optical elements such as the first to third mirrors 3 to 5, lens 6, and CCD 7. When the value exceeds the maintenance cycle, it is difficult to improve the collapse of the color balance by the correction of the present invention.

It is to be noted that in the present embodiment, since an initial value of the adjustment number N counted in steps S16 and S20 is shifted, the moving distance of the lens base 11 corresponds to the number of adjustment times.

It is to be noted that as shown in FIG. 8, in the present embodiment, an example in which the lens base moves in the sub-scanning line direction front SA in steps S12, S15 and moves in the sub-scanning line direction rear SB in step S19 has been described. However, the present invention is not limited to this, and this may also be opposite.

Moreover, in the base moving mechanism of the present invention, when the longer front-side focal distance L2 is changed in focal distances caused by lens characteristics, an adjustment unit can be reduced as the moving distance X1 of the lens base 11.

As described above, in the present embodiment, when at least one of the MTF value D2 and the brightness fluctuation D3 is out of the color MTF balance range, the lens base is moved, the color balance is accordingly corrected, deterioration of quality of a read image is improved, and the image can be read with a stable color concentration. Accordingly, a problem of wrong recognition of color can also be improved.

Moreover, the life of the reading apparatus determined by the deterioration of the lamp which is the light source, the dirt on the mirror, or the deterioration of the correction plate can be extended.

Furthermore, even when the xenon lamp is used as the light source, and illuminance energy of a wavelength of an illuminance distribution of wavelengths drops because of the deterioration of the xenon lamp, a distance between the lens and the reflected point is changed using a simple constitution in which the MTF chart is read to move the lens unit. Accordingly, an output balance from RGB line CCD sensor during scanning of the color image can be smoothed, and a color balanced read image is obtained. Furthermore, in the present invention, according to the constitution, the xenon lamp of the light source is deteriorated with an increase of a use time. Even when the mirror or the chart for correction is dirty, even a draft having a broad color reproduction range can be satisfactorily read without degrading the resolution.

What is claimed is:

1. An image reading apparatus comprising:

a light source which irradiates a reading object with light;

a photoelectric conversion element including a plurality of color sensors upon which a reflected light from the reading object is incident and which are long in a main scanning line direction;

a lens disposed on an optical path of the light guided into the photoelectric conversion element from the light source;

a white reference chart comprising a first concentration;

a line reference chart comprising the first concentration and a second concentration corresponding to a darkest portion of an image;

a balance judgment mechanism which judges whether or not an amplitude of a line signal based on the reflected light from the line reference chart satisfies a color balance condition, by executing an MTF balance mode, based on the first concentration corresponding to a brightest portion of the image based on a reflected light from the white reference chart and the second concentration;

a moving force generation mechanism which applies a predetermined moving force in a case where the light signal does not satisfy the balance condition; and a moving mechanism to move the lens and the photoelectric conversion element and to change an optical path length between the light source and the lens while securing a certain optical path length between the lens and the photoelectric conversion element, when the predetermined moving force is applied to the moving mechanism from the moving force generation mechanism, wherein the line reference chart includes a first chart, and first and second line patterns, and is disposed in a middle portion in which an optical axis of light to be irradiated is positioned and whose image height is 0%, or the line reference chart includes a second chart, and first and second line patterns, and the disposing position corresponds to an image height 70% or more using the middle portion as a reference.

2. An image reading apparatus comprising:

a light source which irradiates a reading object with light;

a photoelectric conversion element including a plurality of color sensors upon which a reflected light from the reading object is incident and which are long in a main scanning line direction;

a lens disposed on an optical path of the light guided into the photoelectric conversion element from the light source;

a white reference chart comprising a first concentration;

a line reference chart comprising the first concentration and a second concentration corresponding to a darkest portion of an image;

a balance judgment mechanism which judges whether or not an amplitude of a line signal based on the reflected light from the line reference chart satisfies a color balance condition, by executing an MTF balance mode, based on the first concentration corresponding to a brightest portion of the image based on a reflected light from the white reference chart and the second concentration;

a moving force generation mechanism which applies a predetermined moving force in a case where the light signal does not satisfy the balance condition; and a moving mechanism to move the lens and the photoelectric conversion element and to change an optical path length between the light source and the lens while securing a certain optical path length between the lens and the photoelectric conversion element, when the predetermined moving force is applied to the moving mechanism from the moving force generation mechanism, wherein the moving mechanism includes a lens base to which the lens and the photoelectric conversion element are fixed, supplies a rotating force to a pinion connected to a motor in a predetermined direction, and moves the lens base via a latch fixed to the lens base by an interlocking structure with the pinion.

3. An image reading apparatus comprising:

a light source which irradiates a reading object with light;

a photoelectric conversion element including a plurality of color sensors upon which a reflected light from the reading object is incident and which are long in a main scanning line direction;

a lens disposed on an optical path of the light guided into the photoelectric conversion element from the light source;

a white reference chart comprising a first concentration;

a line reference chart comprising the first concentration and a second concentration corresponding to a darkest portion of an image;

a balance judgment mechanism which judges whether or not an amplitude of a line signal based on the reflected light from the line reference chart satisfies a color balance condition, by executing an MTF balance mode, based on the first concentration corresponding to a brightest portion of the image based on a reflected light from the white reference chart and the second concentration;

a moving force generation mechanism which applies a predetermined moving force in a case where the light signal does not satisfy the balance condition; and a moving mechanism to move the lens and the photoelectric conversion element and to change an optical path length between the light source and the lens while securing a certain optical path length between the lens and the photoelectric conversion element, when the predetermined moving force is applied to the moving mechanism from the moving force generation mechanism, wherein the color balance conditions indicate that a line output width based on a line signal output from the photoelectric conversion element is 35% or more of an MFT value and a fluctuation of brightness of the light source based on the line value is 10% or less of an MFT difference.

4. A color balance correction method comprising:

obtaining a first concentration level corresponding to a darkest portion of an image;

obtaining a second concentration level corresponding to a brightest portion of the image based on a reflected light from a white reference chart;

obtaining a line signal based on the reflected light from a line chart;

executing an MTF balance mode to judge whether or not the line signal satisfies a balance condition; and executing a moving mode to move a lens and a photoelectric conversion element simultaneously by a predetermined distance in a sub-scanning line direction in order to change a front-side focal distance so that the line signal satisfies the balance condition while securing a certain rear-side focal distance, when the line signal does not satisfy the balance condition.

5. The color balance correction method according to claim 4, wherein the line chart comprises a first line pattern including a plurality of lines of a main scanning line direction having a first concentration and a second line pattern including a plurality of lines of a sub-scanning line direction having a first concentration and crossing the main scanning line direction at right angles, and the first and second line patterns have all line widths which are equal to one another, and have an interval equal to the line width and comprising a second concentration.

6. The color balance correction method according to claim 4, wherein the color balance conditions indicate that a line output width based on a line signal output from the photoelectric conversion element is 35% or more of an MFT value and a fluctuation of brightness of the light source based on the line value is 10% or less of an MFT difference.

7. The color balance correction method according to claim 4, wherein the moving mode comprises:

moving a lens base to which a lens and a photoelectric conversion element are fixed by a first distance in a first direction in a sub-scanning line direction;

obtaining first and second concentration levels and line signal to execute an MTF balance mode based on the levels and the signal;

moving the lens base by the first distance in the first direction, when it is judged that the line signal obtained by the moving of the lens base approaches balance conditions; and obtaining the first and second concentration levels and a color signal again to execute the MTF balance mode based on the levels and signal, and moving the lens base every first distance in the first direction so that the line signal satisfies the balance conditions.

8. The color balance correction method according to claim 4, wherein the moving mode comprises:

moving a lens base to which a lens and a photoelectric conversion element are fixed by a first distance in a first direction in a sub-scanning line direction;

obtaining first and second concentration levels and line signal to execute an MTF balance mode based on the levels and the signal;

moving the lens base by a second distance which is twice the first distance in a second direction which is a direction opposite to the first direction, when it is judged that the line signal is far from balance conditions; and obtaining the first and second concentration levels and the line signal again to execute the MTF balance mode based on the levels and signal, and moving the lens base every first distance in the second direction so that the line signal satisfies the balance conditions.

* * * * *